United States Patent Office 3,131,038
Patented Apr. 28, 1964

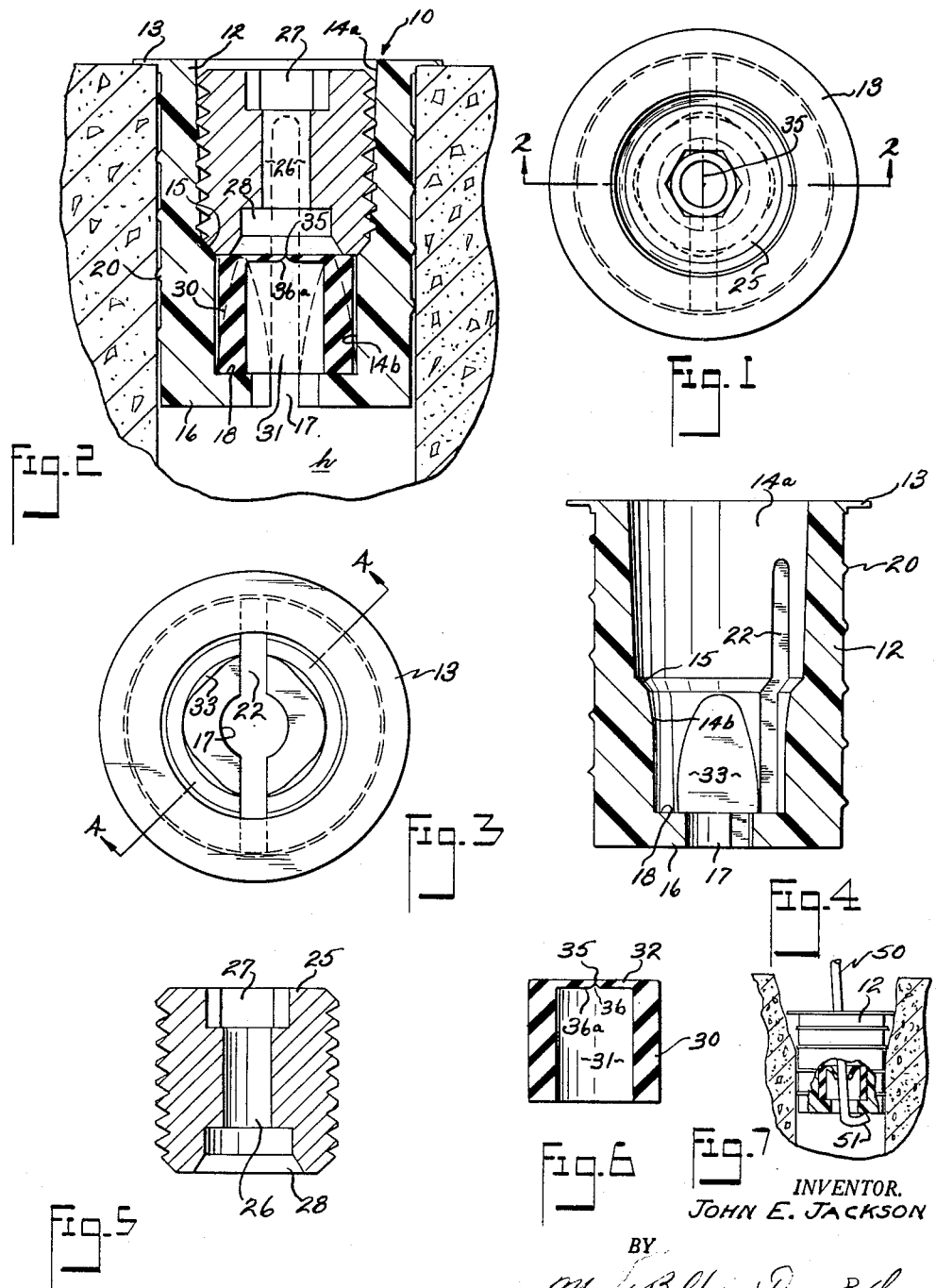

3,131,038
SPUDDING ANCHOR
John E. Jackson, 3258 Belvoir Blvd., Beachwood, Ohio
Filed Apr. 7, 1961, Ser. No. 101,488
2 Claims. (Cl. 48—193)

This invention relates to a novel and improved spudding anchor especially designed for permanent installation in association with a gas utility distribution system or the like.

The spudding anchor of the present invention has particular utility for use in an underground gas utility distribution system carrying combustible gaseous fuel, and is adapted to be permanently installed in the ground overlying the distribution lines of said system, to thereby define permanent "spudding points," preferably at predetermined spaced intervals therealong to enable suitable leakage detection equipment to be inserted therethrough and into the ground whereby gaseous fuel leaking from said lines may be readily detected.

Heretofore, in combustible gaseous fuel distribution systems, wherein the said system is substantially all underground, periodic detection of the distribution lines has been accomplished by first checking external terminal fixtures or sub-structures of said system such as vaults, sewers, manholes, water boxes, gas curb boxes, and the like, whereby easy access to the same is readily obtained, and thereafter, if leakage of gaseous fuel is detected, checking along each of the lines connected thereto by spudding said lines at preselected intervals therealong.

The usual method of spudding in prior methods of leakage detection has been to drill or otherwise provide spudding holes in the ground overlying the distribution lines of said system whereby a detection probe of conventional leakage detection equipment may be inserted and lowered into the area adjacent said lines. As will be recognized, said spudding holes, if left open, permit water and other foreign matter to enter into the ground in the area of said distribution lines whereby the same may be deteriorated at a faster rate than would otherwise normally occur. In addition, the fixtures or sub-structures of said system are oftentimes irregularly spaced and therefore satisfactory investigation or spudding of the distribution lines connected thereto for gas leakage between said fixtures is very time consuming, calling for making special test holes at random along the lines until the leak is located.

For example, in the event that a trace of combustible gas is detected at one of the sub-structures in said distribution system, having several or more lines connected to the same, it has been heretofore required to trace back along each distribution line connected to said fixture while spudding each line at preselected intervals therealong so as to locate and isolate the point or points of leakage prior to evacuating and exposing the leaking line so that the same may be repaired.

The spudding anchor of the present invention is intended to overcome the above disadvantages of said prior leakage detection methods among others, in that it is especially designed to be permanently installed in pavements or sidewalks overlying each of the distribution lines comprising said system, to thereby define "permanent spudding points" at predetermined spaced intervals therealong whereby access to said distribution system at said spaced locations may be readily accomplished by means of suitable conventional leakage detection equipment so that the leakage of gaseous fuel therefrom may be readily detected.

The spudding anchor of the present invention as will later appear is also intended to be normally closed so as to effectively seal the spudding aperture provided therefor and hence the underlying distribution line of said system from the effects of inclement weather, and the like.

It is therefore a primary object of the present invention to provide a novel and improved spudding anchor especially designed for use in a gaseous fuel distribution system and the like, wherein combustible fuel such as gas is distributed by means of underground distribution lines or conduits, and wherein said spudding anchor is intended to be permanently installed in the pavement or sidewalk overlying such pipes and at spaced intervals along said distribution lines whereby access to the same by means of leakage detection equipment may be readily obtained.

Another object of the present invention is the provision of a new and improved spudding anchor especially designed for use in a utility distribution system wherein gaseous fuel or the like is distributed underground by means of a complex distribution line or conduit system, a plurality of said spudding anchors being intended to be permanently installed at spaced intervals along said distribution lines whereby suitable detection apparatus may be inserted therethrough and into close proximity to said distribution lines so that leakage of gaseous fuel therefrom may be readily detected.

Still another object of the present invention is the provision of a new and improved spudding anchor, as is above defined, and which includes sealing means normally closed so as to prevent water or like fluids from seeping therethrough and into the area of said underground system whereby the same may be undermined and/or its erosion accelerated.

Another object of the present invention is the provision of a novel and improved spudding anchor as is above defined and which includes normally closed valve means, said valve means being actuatable to permit the insertion of a probe of gas leakage detection equipment into and through said anchor and into proximity to the distribution lines of said system, said valve means being in sealing relation with said probe to thus prevent seepage of water or like fluid into the area of said system.

Additional objects and advantages of the spudding anchor of the present invention will be readily apparent to one skilled in the art to which it pertains, and upon reference to the following disclosure of a preferred embodiment thereof and which is illustrated in the accompanying drawings wherein:

FIG. 1 is a top plan view of the spudding anchor embodying the concepts of the present invention;

FIG. 2 is a vertical section taken in the plane indicated approximately by the line 2—2 in FIG. 1, and showing said anchor disposed in an operable position in a spudding aperture;

FIG. 3 is a top plan view of the expandable shield of the spudding anchor;

FIG. 4 is a vertical sectional view taken approximately in the plane indicated by the line 4—4 in FIG. 3;

FIG. 5 is a vertical sectional view of the expansion plug incorporated in the spudding anchor of the present invention;

FIG. 6 is a vertical sectional view of the valve or sealing means also used in the spudding anchor; and FIG. 7 is a vertical section of a spudding aperture provided in concrete or like material, having a spudding anchor of the present invention disposed therein, and showing, in addition one means in which the said anchor may be removed from said aperture.

Referring now to the drawings throughout which like elements are designated by the same reference character, and with particular reference directed to FIG. 2, the spudding anchor of the present invention is indicated in its entirety by the reference numeral 10 and is intended to be insertable within each spudding hole h provided in the pavement or sidewalk at predetermined spaced intervals overlying the distribution lines or conduits of the aforementioned fuel distribution system.

In its present form, the spudding anchor is seen to comprise a cup-shaped shield member 12 substantially cylindrical in configuration, preferably constructed from a suitable corrosion resistant material such as for example nylon, polypropylene and the like and which is preferably integrally formed on its open upper end with a circular flange or rim 13.

Said shield member is internally formed with a stepped bore extending centrally therethrough, the upper portion of which, as is identified at 14a, being slightly frusto-conical in vertical elevation, being of maximum diameter at the upper open end of said shield member and decreasing in said diametrical magnitude progressively as said bore extends downwardly therethrough. The lower portion of said bore is of similar configuration, the diameter of its upper end being somewhat less than the diameter of the adjacent bottom end of the upper conical part 14a communicating therewith so as to form an annular shoulder 15 therebetween. The bottom end of said lower bore part 14b is terminated by means of end wall 16 substantially closing the lower end of said shield member and projecting laterally thereacross, said bore part communicating with port 17 found centrally within said end wall to thus define an annular shelf or shoulder 18 surrounding said port.

The exterior surface of the shield member 12 is seen to be formed with suitable ribs preferably in the form of threads as indicated at 20, said threads extending preferably helically therearound, the purpose for which will be presently described.

Said shield member, in addition, is seen to be slotted preferably along diametrically opposite sides as indicated at 22, each of said slots communicating at one end with the aforesaid port 17 in end wall 16, extending radially outwardly through the latter, and extending longitudinally upwardly along said member approximately three-fourths of its length to thus bifurcate said member and thereby define a pair of substantially semi-cylindrical shield member parts.

As previously indicated, the shield member is intended to be inserted within each of the spudding apertures h provided in the pavement at preselected intervals overlying the distribution lines of the utility system, the diameter of said aperture being preferably slightly greater than the external diameter of said shield so as to enable its being easily disposed therein, the circular flange 13 overlying the surface of the pavement surrounding said aperture.

Means are provided to permanently retain the shield member 12 in the spudding aperture h, and for this purpose, the instant form of spudding anchor includes an externally threaded cylindrical plug 25 formed preferably of a corrosion-resistant material such as aluminum.

The plug is intended to be screwed into the upper conical part 14a of the shield member bore as is shown in FIG. 2, the external threads thereof biting into the wall of said bore so as to cause each of the bifurcated parts of said shield member to flex outwardly whereby the external threads 20 formed on the outer surface of the same press firmly against the wall of the spudding aperture and thereby firmly anchor said shield member within said aperture.

The plug 25 is seen to be formed centrally with an internal bore 26 extending longitudinally therethrough in axial alignment with the shield member port 17 and communicating at its one end with a counterbore 27 and similarly at its opposite end with a counterbore 28, the latter in turn communicating with the shield member bore port 14b and connecting port 17.

With this assembly in place (after a hand auger has drilled through the ground to the top of the distribution line) the probe of conventional leakage detection equipment (not herein shown) may be extended through the plug bore 26 and communicating shield bore 14b and connected port 17 and hence through the ground therebelow and into the area of the underlying distribution line whereby any gaseous fuel leaking from the latter may be readily detected.

An important structural feature of the spudding anchor of the present invention relates to the use of novel seal means, now to be described, which is operable to normally seal the spudding aperture h from atmosphere while yet permitting the insertion of the aforesaid detection probe into said aperture in the manner just described.

As best seen in FIGS. 2 and 6, in its present form the seal means, as is identified at 30, is seen to be substantially thimble-like in configuration being constructed preferably of a suitable pliable material such as soft rubber or preferably neoprene. Said member 30 is centrally provided with an internal chamber 31, being closed at its upper end by means of end wall 32.

As best seen in FIG. 2, the member 30 is intended to be disposed in an inverted position within the lower bore portion 14b of the shield member 12, the open end of said member resting upon the aforementioned annular shelf 18, whereby its chamber 31 communicates with port 17. Preferably, but not necessarily, a plurality of abutments or protuberances 33, somewhat elliptical in configuration are provided on the wall of said bore portion 14b, being preferably spaced apart approximately 90° from each other and projecting into said bore so as to center said thimble member 30 therein and over the connecting port 17.

Said thimble member is preferably of such height so as to extend upwardly through said bore portion 14b and to terminate in its free or undisplaced state approximately at the bottom edge of the annular shoulder 15.

With this assembly, the aforesaid end wall 32 of the thimble member extends across the upper portion of the bore part 14b.

The plug 25 is screwed into the upper bore portion 14a so that its lower end presses firmly against the thimble member 30 thereby effecting a seal between said plug and the end wall 16 of the said shield member to hence prevent moisture from seeping downwardly between said members and into the spudding aperture h.

To permit the insertion of the detection probe as is aforementioned to be inserted into the chamber 31, the end wall 32 of the thimble member 30, as may be best seen in FIGS. 2 and 6, is preferably diametrically cut or slit to thus form a normally closed port or valve 35 through which said probe may be projected. The resilient characteristics of said wall permit the insertion of said probe through said port 35, while permitting the peripheral edge defining said port to closely conform to the exterior configuration of said probe remaining thereby in sealing relation with said probe to thus prevent the admission of moisture or the escape of gas from said spudding aperture while said probe is being used.

As best seen in FIG. 6, the inner surface of the end wall 32 is provided with a generally V-shaped groove 36 having curved side walls 36a extending diametrically thereacross, the apex of which coincides with the slit forming port 35, said weakened portion of said wall thereby enabling the curved lips of port 35 as thereby formed to flex with the probe moving therepast to thus permit the latter to be readily inserted and the curved or sloping walls at 36a permitting easy withdrawal of the probe from said thimble member. As seen in FIG. 2, the counterbore 28 provided in said plug opens to the upper end of the thimble member 30 to thereby permit the aforesaid curved lips of port 35 to bend upwardly therein with the upward movement of the probe.

As will be understood, it may occur that as a result of the material in which the spudding anchor is disposed, for example, a concrete roadway or walk as viewed in FIG. 7, being subjected to heavy vehicular or pedestrian traffic, the spudding aperture h in said material partially and/or completely caves in. When this occurs, the bifurcated parts of the shield member will flex inwardly to prevent the latter from becoming wedged in said aperture and a suitable tool, for example, the tool shown at 50 in FIG. 7, may then be inserted through the plug 26, downwardly through the thimble member, said tool preferably having a hooked end 51 which is then extended through the port 17 in the shield member and underneath the bottom end of the latter. Thus, by pulling upward on said tool, the spudding anchor may be easily withdrawn from the spudding aperture, and thereby applicable for disposition in a new spudding aperture.

Having described a preferred embodiment, it will now be realized that the spudding anchor of the present invention is capable of providing a permanent spudding anchor for use in a gaseous fuel distribution system wherein said anchor is closed while not in use so as to effectively seal its associated spudding aperture and hence the underlying distribution system.

Having thus disclosed my invention, it will be apparent that the same is susceptible to various modifications, embodiments and combinations of elements without departing from the inventive concepts thereof as defined in the appended claims.

What is claimed is:

1. A spudding anchor for permanent installation in a vertical position in a spudding aperture, comprising a cup-shape body having a bottom and side walls and having an internal bore formed therein and opening to its upper end, an annular rim portion extending radially outward at said upper end, said body being adapted to be inserted into said aperture with said annular rim portion overlying the surface surrounding said aperture, said bore being frusto-conical in vertical configuration and of maximum diameter at said open end and of minimum diameter at its opposite end, said body being formed with a plurality of slots extending through the bottom edge thereof and upwardly longitudinally of said body dividing the side walls of said body for a sufficient length to provide a plurality of flexible body parts, aperture gripping projections spaced longitudinally along said body parts and extending outwardly therefrom, a cylindrical plug threadable into said conical bore from said upper end of said body effective to flex said body parts outwardly about said upper end whereby said projections may press firmly against the wall of such an aperture to secure said body in the latter, there being a central opening through the bottom of said body and an internal shoulder around said opening, a valve within said bore resting upon said shoulder and having a central self-sealing opening axially aligned with said bottom opening, said plug having a central opening axially aligned with said aforesaid openings, and said plug holding said valve on said internal shoulder, whereby a probe may be passed downwardly through said aligned openings and said valve prevents dirt falling into said aperture between probings.

2. A spudding anchor as defined in claim 1, wherein said valve includes a pair of flexible lips extending across said self-sealing opening and meeting centrally thereof in sealing relationship, said lips being flexed downwardly in said bore by the insertion of a leakage detection probe so as to enable its penetration into said aperture, and said lips having weakened portions to facilitate their being flexed upwardly toward said upper end of said body in response to the withdrawal of said probe.

References Cited in the file of this patent

UNITED STATES PATENTS

| | | |
|---|---|---|
| 2,240,716 | Pleister et al. | May 6, 1941 |
| 2,244,151 | Hamilton | June 3, 1941 |
| 2,314,770 | Cogswell | Mar. 23, 1943 |
| 2,349,463 | Reddell | May 23, 1944 |
| 2,658,434 | Miller | Nov. 10, 1953 |
| 2,672,999 | Protasoff | Mar. 23, 1954 |
| 2,688,979 | Kendrick | Sept. 14, 1954 |
| 2,784,865 | Rieke | Mar. 12, 1957 |
| 2,958,592 | Heath | Nov. 1, 1960 |